US 8,055,915 B2

(12) United States Patent
Klazynski et al.

(10) Patent No.: US 8,055,915 B2
(45) Date of Patent: Nov. 8, 2011

(54) METHOD AND SYSTEM FOR ENABLING AND DISABLING HARDWARE BASED ON RESERVATIONS AND USAGE HISTORY

(75) Inventors: James Nicholas Klazynski, Austin, TX (US); Samuel Garrett Young, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 953 days.

(21) Appl. No.: 11/853,380

(22) Filed: Sep. 11, 2007

(65) Prior Publication Data

US 2009/0070614 A1 Mar. 12, 2009

(51) Int. Cl.
*G06F 1/00* (2006.01)
*G06F 1/26* (2006.01)
*G06F 1/32* (2006.01)
*G06F 15/16* (2006.01)
*G06F 15/173* (2006.01)

(52) U.S. Cl. ........ 713/300; 713/310; 713/320; 713/323; 709/208; 709/226

(58) Field of Classification Search ............... 713/300, 713/310, 320, 323; 709/208, 226
See application file for complete search history.

(56) References Cited

U.S. PATENT DOCUMENTS

| | | | |
|---|---|---|---|
| 6,654,895 B1 | 11/2003 | Henkhaus et al. | |
| 7,143,300 B2 | 11/2006 | Potter et al. | |
| 7,590,873 B2 * | 9/2009 | Takahashi et al. | 713/300 |
| 7,636,861 B2 * | 12/2009 | Leech et al. | 713/310 |
| 2002/0178387 A1 | 11/2002 | Theron | |
| 2005/0071702 A1 * | 3/2005 | Morisawa | 713/320 |
| 2005/0204190 A1 | 9/2005 | Cromer et al. | |
| 2006/0164421 A1 * | 7/2006 | Cromer et al. | 345/473 |
| 2006/0168457 A1 * | 7/2006 | Leech et al. | 713/300 |
| 2006/0168462 A1 * | 7/2006 | Leech et al. | 713/310 |

* cited by examiner

*Primary Examiner* — Ji H Bae
(74) *Attorney, Agent, or Firm* — Yee & Associates, P.C.; Jeffrey S. LaBaw

(57) ABSTRACT

A network device checkout system is accessed by another program that powers off unused systems. The checkout system keeps track of the usage of various systems on a network so that only the systems that need to remain on for productivity will consume power, with systems in a check-in state being powered off. Records of system usage are stored in an associated database. Systems that are no longer being utilized are powered off.

20 Claims, 7 Drawing Sheets

METHOD AND SYSTEM FOR ENABLING AND DISABLING HARDWARE BASED ON RESERVATIONS AND USAGE HISTORY

BACKGROUND OF THE INVENTION

1. Field of the Invention

The present invention relates generally to a computer implemented method, a data processing system, and a computer program product for enabling and disabling network hardware. More specifically, the present invention relates to a computer implemented method, a data processing system, and a computer program product for remotely enabling and disabling network hardware based on a hardware reservation process a usage history of the network hardware.

2. Description of the Related Art

In a large computing environment, electrical power is consumed in great quantities. Systems are left on and unused, sometimes for extended time periods. Electricity is used to keep the computers powered on, and to power the heat pumps and air conditioning units that must constantly run to compensate for the huge amount of heat that is put out by the abundance of computers. This results in a huge cost to the organization operating the computing environment.

While manually powering-off systems may be a practical solution to this problem, often times it is not the most optimal or cost-effective solution. With the popularity of working from remote locations, systems often need to be made available for remote access from anywhere by a person at any time of day. Thus, in many computer laboratories, thousands of physical systems and virtual systems stay powered on for use a variable times, even though the systems may be idle for extended time periods. An effective management of system power usage that still allows for remote access to the computer systems would result in monetary savings that would otherwise not be possible.

SUMMARY OF THE INVENTION

Computer implemented methods, computer program products, and data processing systems are provided for managing power in a network environment. A checkout request is received by a server. Responsive to receiving the request, the server identifies a set of systems as a free system. A user selects a selected system from the list of free systems. The selected system is then assigned to the user. The selected system is then powered-on.

After the system is checked out by the user, and responsive to powering-on the selected system, the selected system is monitored to identify a check-in state. Should the checked out system be found in a check-in state, the selected system is unassigned from the user, and is powered down.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
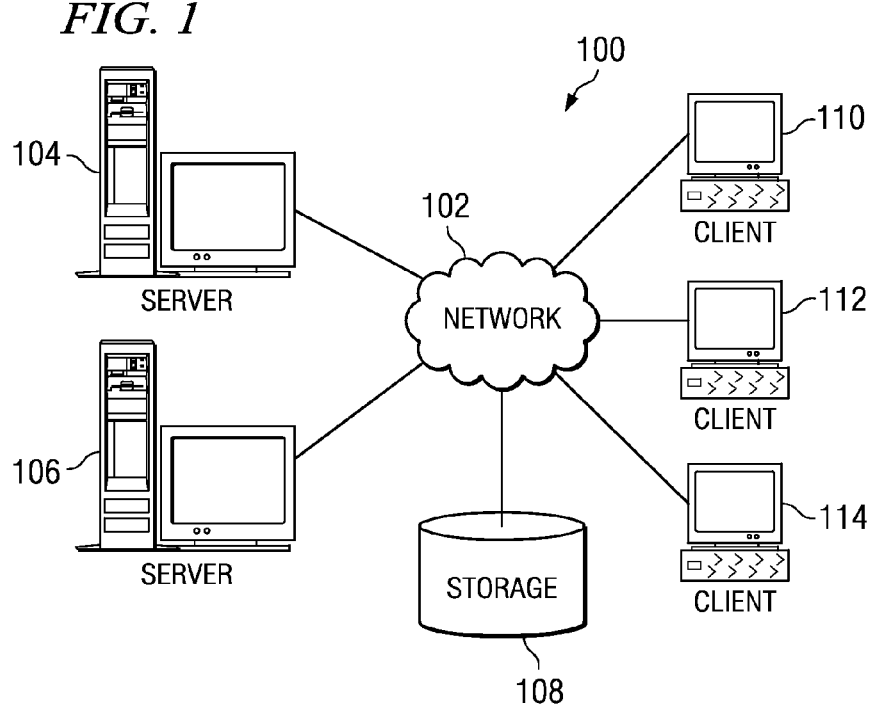
FIG. 1 depicts a pictorial representation of a network of data processing systems in which illustrative embodiments may be implemented.
Figure 2:
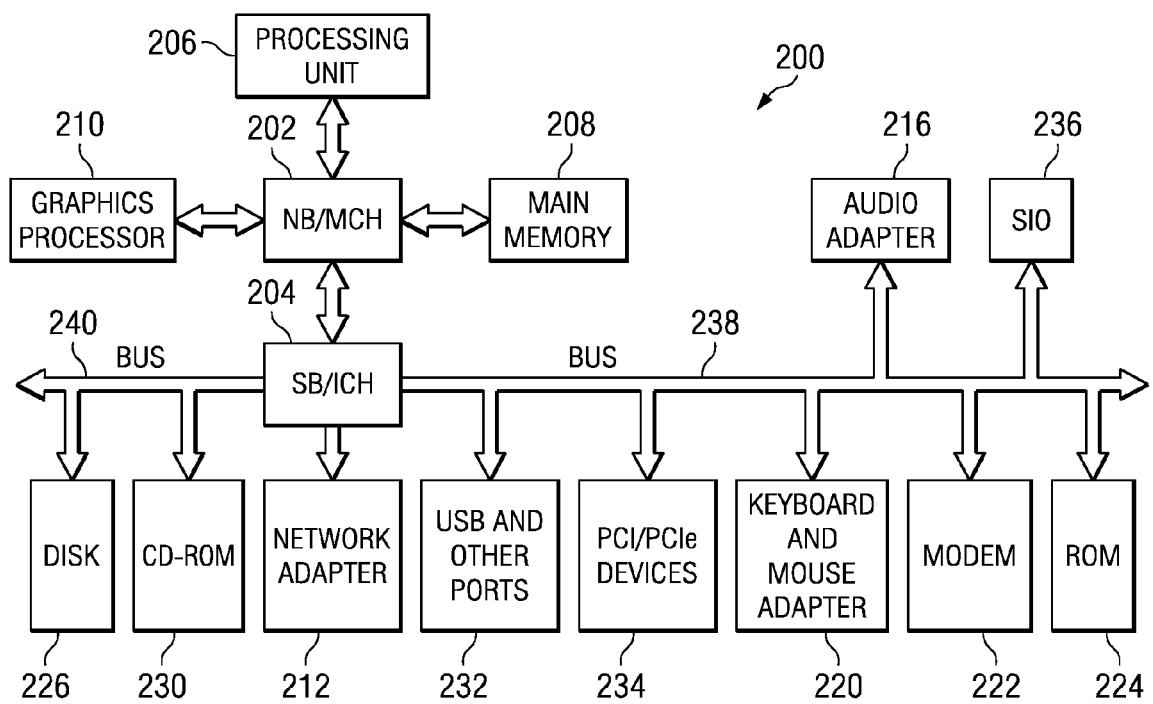
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In accordance with the illustrative embodiments, a network system checkout system is accessed by another program that powers off unused systems. When a user checks out a system, it is powered on. The checkout system keeps track of the usage of various systems on a network so that only the systems that need to remain on for productivity will consume power, with systems in a check-in state being powered off. A check-in state can be a user defined action, such as a lease expiration for the checked out system. The check-in state may also be a detection of an idle state. Records of system usage are stored in an associated database.

When a user checks out a system in the inventory, a message is sent to the power server, and a "power-on" command is issued, powering the system on. The "power-on" command can be a "wake on local area network" command. The system is active as long as the user has the system checked out, and will remain powered on so long as the system remains unflagged as not idle and unexpired.

At predetermined time intervals, the database is checked by the inventory system for network systems that have "expired" and are no longer in use. Expired systems are marked as being in a "check-in" state. The inventory system sends a list of systems that are not being used to the power image server. The power image server then powers the systems off through an imaged power-off program. Networked systems are powered down and will be powered on when they are subsequently checked out.

Figure 3A:
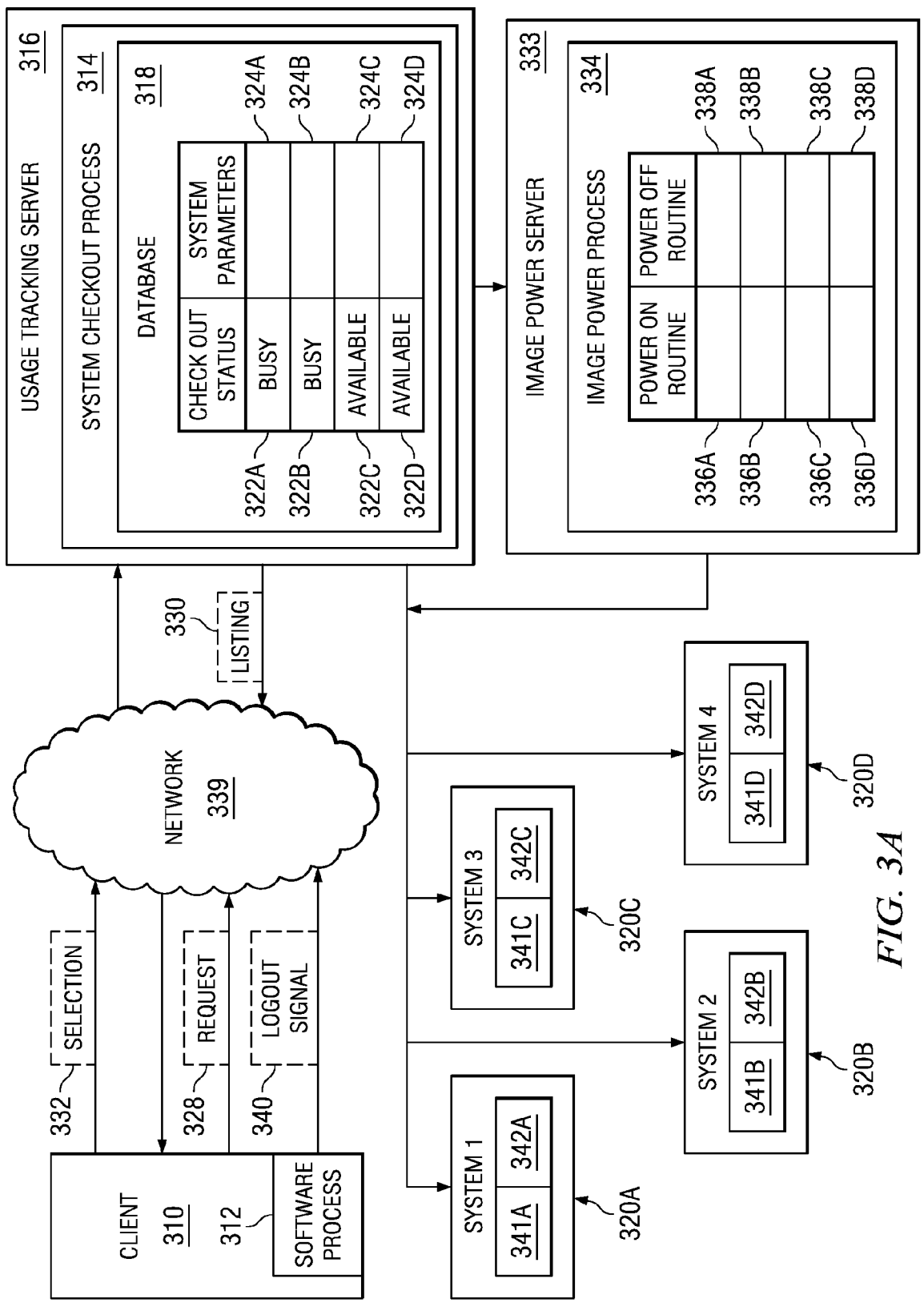
FIG. 3A is a block diagram of a data processing system in which illustrative embodiments may be implemented.

Referring now to FIG. 3A, a block diagram of a data processing system is shown in which illustrative embodiments may be implemented. Client 310 can be clients 110-114 of FIG. 1. Usage tracking server 316 is a server such as server 104-106 of FIG. 1. Image power server 336 is a server such as server 104-106 of FIG. 1. In one illustrative embodiment, usage tracking server 316 and image power server 336 may be a single server.

Client 310 is a client such as clients 110-114 of FIG. 1. Client 310 runs software process 312. Software process 312 provides an interface for client 310 to access system checkout process 314 running on usage tracking server 316.

System checkout process 314 is a software process that monitors and tracks assigned systems on network 339. System checkout process 314 maintains database 318 listing each system 320A-320D capable of being checked out, and the corresponding checkout status 322A-322D for each of those systems. Checkout status 322A-322D is an indication of whether a particular system 320A-320D is currently assigned to a particular client, i.e., busy, or is available for assignment to a new client, i.e., available. Database 318 may also contain system parameters 324A-324D. System parameters 324A-324D can include, but are not limited to, physical characteristics for each system 320A-320D, such as processor speeds, available memory, etc. System parameters 324A-324D can also likewise include, but are not limited to, network connectivity information, such as ping rates and network access speeds. System parameters 324A-324D can also likewise include, but are not limited to, installed software information, such as a listing of available software programs that are installed on a given system.

Software process 312 sends a checkout request 328 to system checkout process 314. Upon receiving checkout request 328, system checkout process 314 polls database 318 to identify a set of systems, such as systems 320A-320D, having a checkout status 322A-322D marked as available. A set of systems is one or more systems, such as systems 320A-320D. System checkout process 314 then returns a listing of those systems 320C-320D having a checkout status 322A-322D marked as available to client 310. Systems 320C-320D having a checkout status 322C-322D marked as available, i.e. "available systems" 320C-320D, are a subset of systems 320A-320D. Systems 320A-320B having a checkout status 322A-322B marked as busy, i.e. "busy systems" 320A-320B, are a subset of systems 320A-320D. System checkout process 314 may also return to client 318, the system parameters 324C-324D for available systems 320C-320D.

Software process 312 can then present client 310 with a listing 330 of available systems 320C-320D, as well as system parameters 324C-324D of each available system 320C-320D. From this information, client 310 is able to select a system to access based on the needs of client 310 and the system parameters 324C-324D for each available system 320C-320D.

Client 310 inputs selection 332, chosen from the listing 330 of available systems 320C-320D, into software process 312 for a selected system 320D to be reserved. Selected system 320D is a subset of available systems 320C-320D. Software process 312 then forwards selection 332 to system checkout process 314.

Upon receiving selection 332, system checkout process 314 marks the checkout status 322D for the selected system 320D as busy. System checkout process 314 then provides notification to image power process 334 on image power server 333 that selection 332 has been received for selected system 320D.

Image power process 334 is a software process running on image power server 336. Image power process 334 includes power-on routines 336A-336D and power-off routines 338A-338D for each system 320A-320D connected to the network. One or more of power-on routines 336A-336D can be a single routine that is operable on multiple systems; similarly, one or more of power-on routines 336A-336D can be system specific, such that a unique power-on routine is required for a certain system. One or more of power-off routines 338A-338D can be a single routine that is operable on multiple systems; similarly, one or more of power-off routines 338A-338D can be system specific, such that a unique power-off routine is required for a certain system.

Upon receiving notification from system checkout process 314 that selection 332 has been received for selected system 320D, image power process 334 forwards the corresponding power-on routine 336D to the selected system 320D. Selected system 320D is initially in a powered-off or power reduced state. In response to receiving power-on routine 336D, selected system 320D is powered on. A connection between selected system 320D and client 310 is implemented through network 339, such that client 310 can now access selected system 320D and the resources, programs, and data thereon.

When client 310 is finished utilizing selected system 320D, client 310 can send check-in signal 340. Client 310 enters check-in signal 340 into software process 312. Software process 312 forwards the check-in signal 340 to system checkout process 314. System checkout process 314 marks the checkout status 322D for the selected system 320D as available. System checkout process 314 then provides notification to image power process 334 that check-in signal 340 has been received for selected system 320D. In an alternative illustrative embodiment, system checkout process 314 assigns a lease expiration time to selected system 320D at the time of checkout. At the conclusion of the lease expiration time, checkout process 314 may spontaneously provide notification to image power process 334 that selected system 320D should be powered off.

Upon receiving notification from system checkout process 314 that check-in signal 340 has been received for selected system 320D, image power process 334 forwards the corresponding power-off routine 338D to selected system 320D. In response to receiving power-off routine 338D, selected system 320D is powered off. The connection between selected system 320D and client 310 through network 339 is terminated, such that client 310 can no longer access selected system 320D and the resources, programs, and data thereon, without again going through the checkout process.

As an additional power saving measure, each system 320A-320D is provided with idle-time counters 341A-341D. Idle-time counters 341A-341D are software processes executing on each of systems 320A-320D. Idle-time counters 341A-341D count times that systems 320A-320D remains idle, and compares the idle time to a time threshold 342A-342D. Time thresholds 342A-342D can be universal threshold that is applied to each of systems 320A-320D; contrarily, one or more of time thresholds 342A-342D can be system specific, such that a unique time threshold 342A-342D is applied to each system 320A-320D. If selected system 320D is utilized prior to idle-time counter 341D reaching time threshold 342D, i.e., if client 310 accesses resources, programs, or data on selected system 320D prior to idle-time counter 341D reaching time threshold 342D, idle-time counter 341D is reset. Idle-time counter 341D then begins again to count the time that selected system 320D remains idle.

Figure 3B:
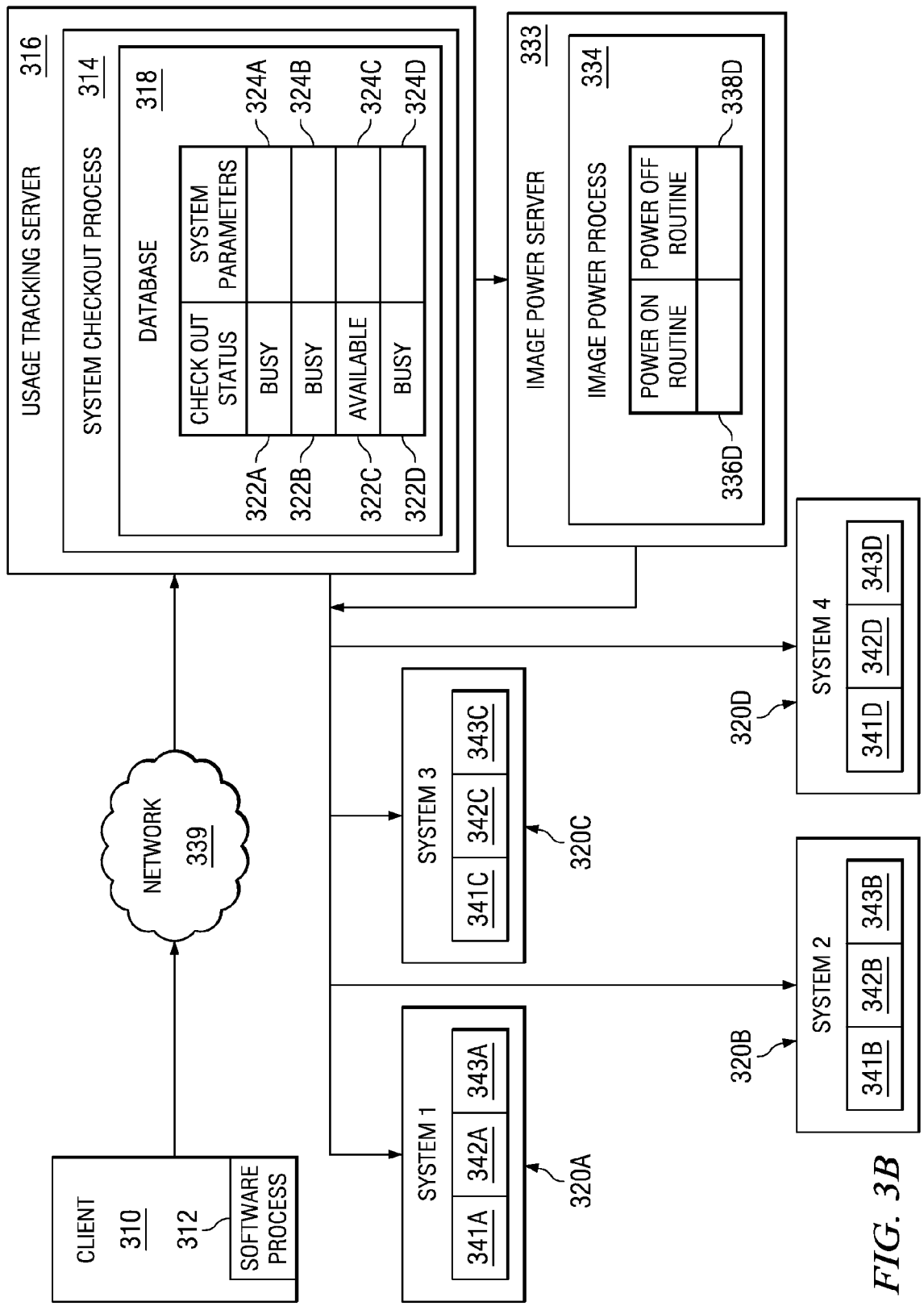
FIG. 3B is a block diagram of a data processing system in which illustrative embodiments may be implemented.

Referring now to FIG. 3B, a block diagram is shown of a data processing system in which illustrative embodiments may be implemented. In one illustrative embodiment, if selected system 320D is not utilized prior to the idle-time counter 341D reaching time threshold 342D, i.e., if client 310 does not access resources, programs, or data on the selected system 320D within the predetermined time period, idle-time counter 341D sets flag 343D. Flag 343D can indicate that selected system 320D is in a "check-in" state. For busy systems 320A, 320B, and 320D, i.e., those systems 320A, 320B, and 320D having a checkout status 322A, 322B, and 322D marked as busy, system checkout process 314 polls each of busy systems 320A, 320B, and 320D to identify if any of flags 343A, 343B, or 343D have been set.

In response to flag 343D being set, system checkout process 314 marks the checkout status 322D for the selected system 320D as available. System checkout process 314 then provides notification to image power process 334 that flag 343D was set for selected system 320D.

Upon receiving notification from system checkout process 314 that flag 343D was set for selected system 320D such that selected system 320D has "expired" and therefore is in a "check-in" state, image power process 334 forwards the corresponding power-off routine 338D to the selected system 320D. In response to receiving power-off routine 338D, selected system 320D is powered off. The connection between selected system 320D and client 310 through network 339 is terminated, such that client 310 can no longer access selected system 320D and the resources, programs, and data thereon, without again going through the checkout procedure.

Figure 3C:
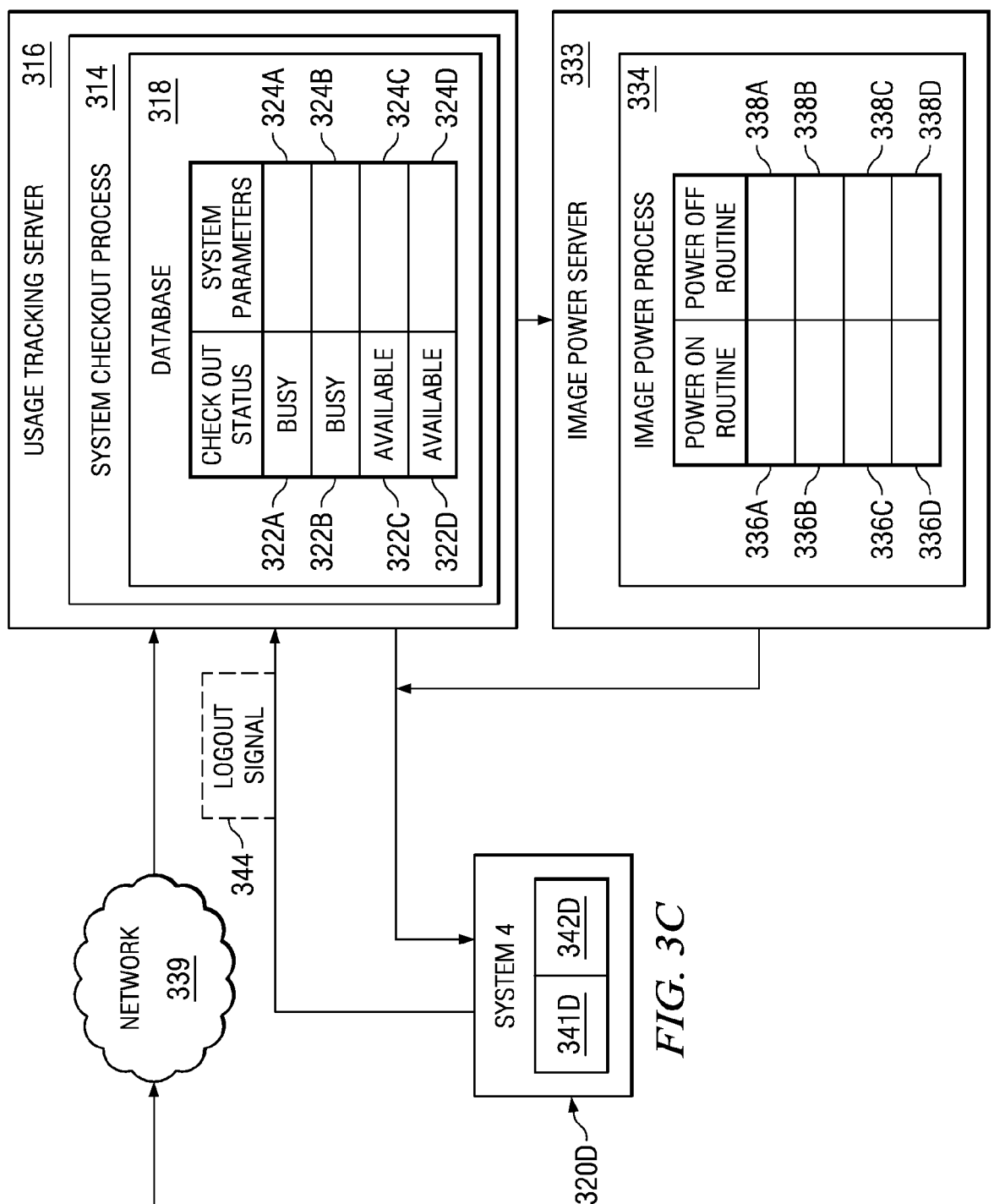
FIG. 3C is a block diagram of a data processing system in which illustrative embodiments may be implemented.

Referring now to FIG. 3C, a block diagram is shown of a data processing system in which illustrative embodiments may be implemented. In an alternative illustrative embodiment, if selected system 320D is not utilized prior to the idle-time counter 341D reaching time threshold 342D, i.e., if client 310 does not access resources, programs, or data on the selected system 320D within the predetermined time period, idle-time counter 341D sends check-in signal 344 to system checkout process 314.

Responsive to receiving check-in signal 344, system checkout process 314 marks the checkout status 322D for the selected system 320D as available. System checkout process 314 then provides notification to image power process 334 that check-in signal 344 has been received for selected system 320D.

Upon receiving notification from system checkout process 314 that check-in signal 344 has been received for selected system 320D, image power process 334 forwards the corresponding power-off routine 338D to the selected system 320D. In response to receiving power-off routine 338D, selected system 320D is powered off. The connection between selected system 320D and client 310 through network 339 is terminated, such that client 310 can no longer access selected system 320D and the resources, programs, and data thereon, without again going through the checkout process.

Figure 4:
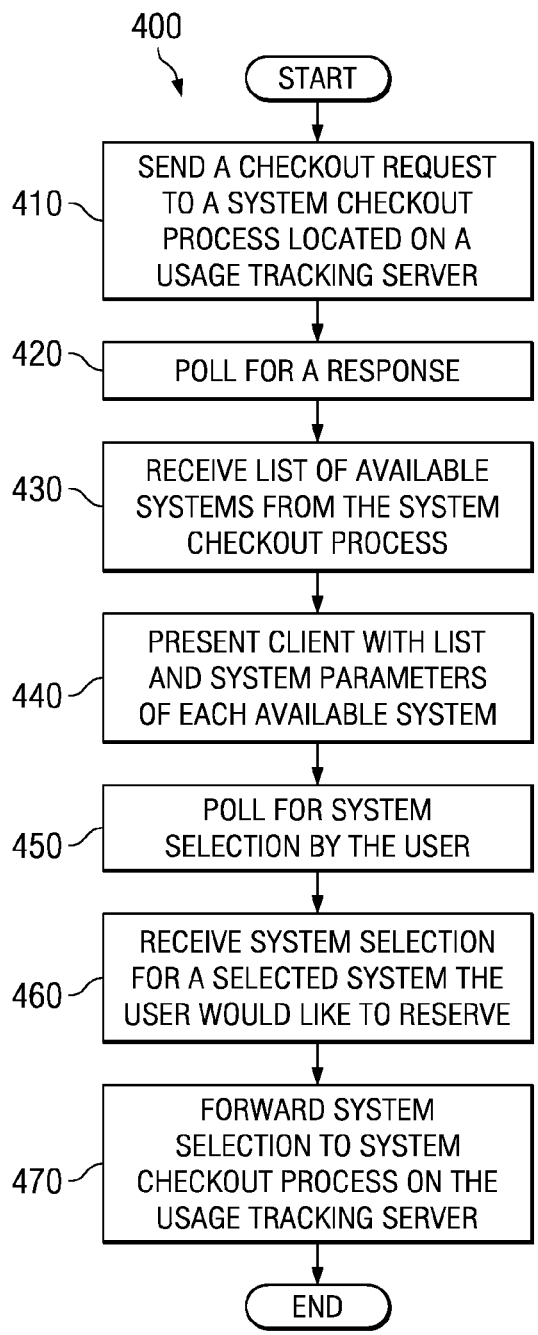
FIG. 4 is a block diagram for a client process for reserving and connecting to remote systems in which illustrative embodiments may be implemented.

Referring now to FIG. 4, a block diagram is shown for a client process for reserving and connecting to remote systems in which illustrative embodiments may be implemented. Process 400 is a process that maybe implemented in a software component, such as software process 312 of FIG. 3A-C.

Process 400 is implemented on a client, such as client 310 of FIG. 3A-C. Process 400 provides an interface for a client to access a system checkout process, such as system checkout process 314 of FIG. 3A-C, running on a usage tracking server, such as usage tracking server 316 of FIG. 3A-C.

Process 400 begins by sending a checkout request to a system checkout process located on a usage tracking server (step 410), and begins polling for a response (step 420). Upon receiving the checkout request, the system checkout process polls a database to identify each system having a checkout status marked as available. System checkout process then returns a listing of those systems having a checkout status marked as available to the client.

Process 400 receives the list of available systems from the system checkout process (step 430). Process 400 then presents the client with the list of available systems, as well as system parameters of each available system (step 440), and polls for a system selection by the user (step 450). From this information, the client is able to select a system to access based on the needs of the client and the system parameters for each available system.

Process 400 receives the system selection for a selected system, chosen from the listing of available systems, which the user would like to reserve (step 460). Process 400 then forwards the system selection to the system checkout process on the usage tracking server (step 470), with the process terminating thereafter. The system checkout process marks the checkout status for the selected system as busy. The system checkout process then provides notification to the image power process that a selection has been received for selected system. The image power process forwards a corresponding power-on routine to the selected system. In response to receiving power-on routine, the selected system is powered on. A connection between the selected system and the client is implemented through a network, such that the client can now access the selected system and the resources, programs, and data thereon.

Figure 5:
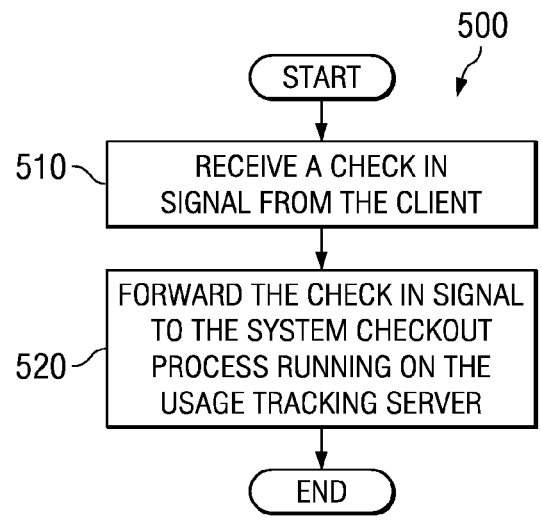
FIG. 5 is a block diagram for a client process for checking in remote systems in which illustrative embodiments may be implemented.

Referring now to FIG. 5, a block diagram is shown for a client process for checking-in of remote systems in which illustrative embodiments may be implemented. Process 500 is a process that may be implemented in a software component, such as software process 312 of FIG. 3. Process 500 is implemented on a client, such as client 310 of FIG. 3. Process 500 provides an interface for a client to access a system checkout process, such as system checkout process 314 of FIG. 3, running on usage tracking server, such as usage tracking server 316 of FIG. 3.

When a client is finished utilizing a selected system, the client can send a check-in signal. Process 500 begins by receiving a check-in signal from the client (step 510). Software process 500 forwards the check-in signal to the system checkout process running on the usage tracking server (step 520), with process 500 terminating thereafter.

The system checkout process marks the checkout status of the selected system as available. The system checkout process then provides notification to an image power process that a check-in signal has been received for selected system. The image power process the forwards a corresponding power-off routine to the selected system. In response to receiving the power-off routine, the selected system is powered off. The connection between the selected system and the client through a network is terminated, such that the client can no longer access the selected system and the resources, programs, and data thereon, without again going through the checkout process.

Figure 6:
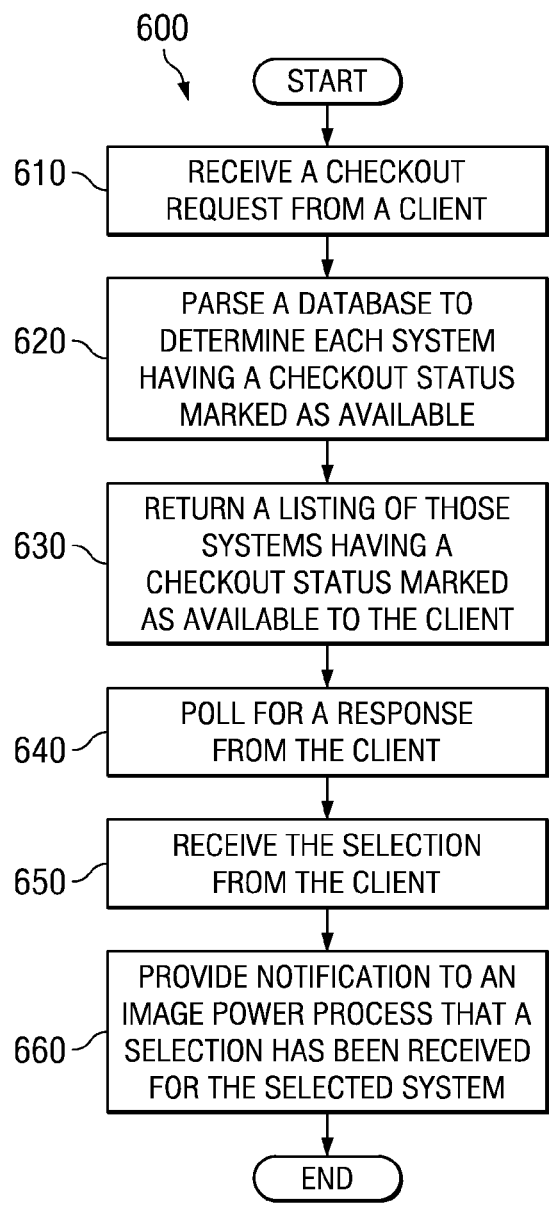
FIG. 6 is a block diagram for a server process for connecting a remote user to a networked system and tracking system usage in which illustrative embodiments may be implemented.

Referring now to FIG. 6, a block diagram is shown for a server process for connecting a remote user to a networked system and tracking system usage in which illustrative embodiments may be implemented. Process 600 is a process in a software component, such as system checkout process 314 of FIG. 3. Process 600 is implemented on a server, such as usage tracking server 316 of FIG. 3. Process 600 monitors and tracks assigned systems on a network. Process 600 further maintains a database listing each system capable of being checked out to a client, and a corresponding checkout status for each of those systems.

Process 600 begins by receiving a checkout request from a client (step 610). Responsive to receiving the checkout request, process 600 parses a database to identify each system having a checkout status marked as available (step 620). Process 600 then returns a listing of those systems having a checkout status marked as available to the client (step 630). Process 600 may also return to the client 318 system parameters for the available systems. Process 600 then polls for a response from the client (step 640).

The client inputs a selection for a selected system, chosen from the listing of available systems, which the client would like to reserve. Process 600 receives the selection from the client (step 650).

Responsive to receiving the selection, process 600 marks the checkout status for the selected system as busy in the database. Process 600 then provides notification to an image power process that a selection has been received for the selected system (step 660), with process 600 terminating thereafter. The image power process forwards a corresponding power-on routine to the selected system. In response to receiving the power-on routine, the selected system is powered on. A connection between the selected system and the client is implemented through a network, such that the client can now access the selected system and the resources, programs, and data thereon.

Figure 7:
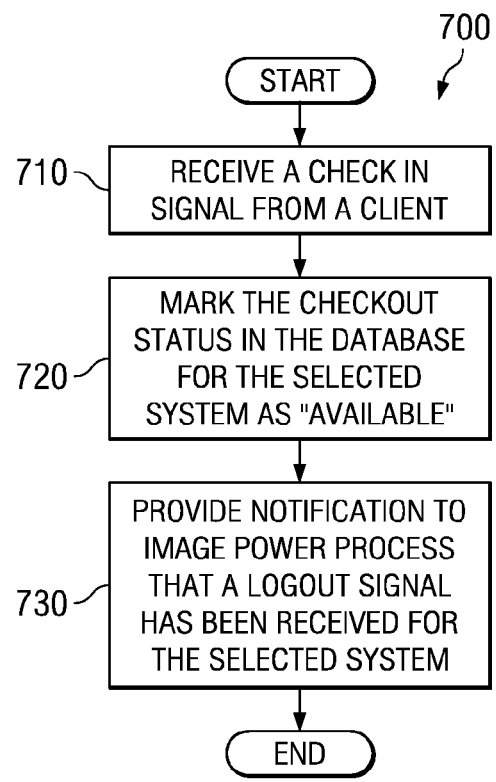
FIG. 7 is a block diagram for a server process for terminating a connection between a remote user and a networked system in which illustrative embodiments may be implemented.

Referring now to FIG. 7, a block diagram is shown for a server process for terminating a connection between a remote user and a networked system in which illustrative embodiments may be implemented. Process 700 is a software process such as system checkout process 314 of FIG. 3A-C. Process 700 is implemented on a server, such as usage tracking server 316 of FIG. 3A-C. Process 700 monitors and tracks assigned systems on a network.

Process 700 further maintains a database listing each system capable of being checked out to a client, and a corresponding checkout status for each of those systems.

Process 700 begins by receiving a check-in signal from a client (step 710). Responsive to receiving the check-in signal, process 700 marks the checkout status in the database for the selected system as available (step 720). Process 700 then provides notification to image power process that a check-in signal has been received for the selected system (step 730), with process 700 terminating thereafter.

The image power process then forwards a corresponding power-off routine to the selected system. In response to receiving the power-off routine, the selected system is powered off. The connection between the selected system and the client through a network is terminated, such that client can no longer access selected system and the resources, programs, and data thereon, without again going through the checkout process.

Figure 8:
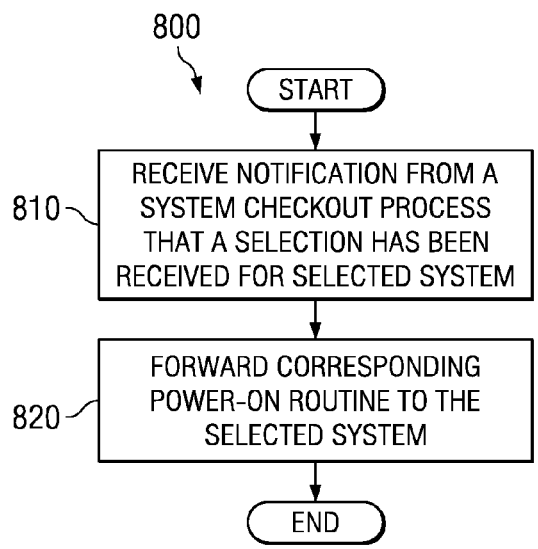
FIG. 8 is a block diagram for a server process for powering-on networked systems in which illustrative embodiments may be implemented.

Referring now to FIG. 8, a flowchart of a server process for powering-on networked systems in which illustrative embodiments may be implemented. Process 800 is a process in a software component, such as image power process 334 of FIG. 3A-C. Process 800 is implemented on a server, such as image power server 336 of FIG. 3A-C.

Process 800 begins by receiving a notification from a system checkout process that a selection has been received for the selected system (step 810). Process 800 includes power-on routines for each networked system connected to a network.

Responsive to receiving notification from the system checkout process that a selection has been received for the selected system, process 800 forwards the corresponding power-on routine to the selected system (step 820), with the process terminating thereafter.

In response to receiving the power-on routine, the selected system is powered on. A connection between the selected system and the client is implemented through a network, such that the client can now access the selected system and the resources, programs, and data thereon.

Figure 9:
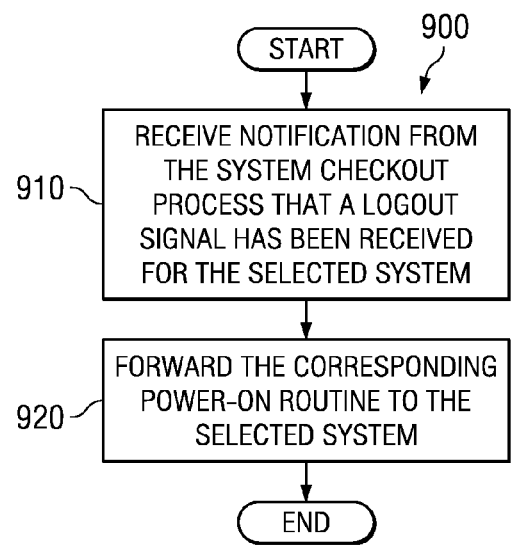
FIG. 9 is a block diagram for a server process for powering-off networked systems in which illustrative embodiments may be implemented.

Referring now to FIG. 9, a flowchart for a server process for powering-off networked systems in which illustrative embodiments may be implemented. Process 900 is a process in a software component, such as image power process 334 of FIG. 3A-C. Process 900 is implemented on a server, such as image power server 336 of FIG. 3.

Process 900 begins by receiving a notification from the system checkout process that a check-in signal has been generated for the selected system (step 910). Process 900 includes power-off routines for each networked system connected to a network.

Responsive to receiving notification from the system checkout process that a selection has been received for the selected system, process 900 forwards the corresponding power-off routine to the selected system (step 920). Process 900 terminates thereafter.

In response to receiving the power-off routine, the selected system is powered off. The connection between the selected system and the client through a network and a network is terminated, such that the client can no longer access the selected system and the resources, programs, and data thereon, without again going through the checkout process.

Figure 10:
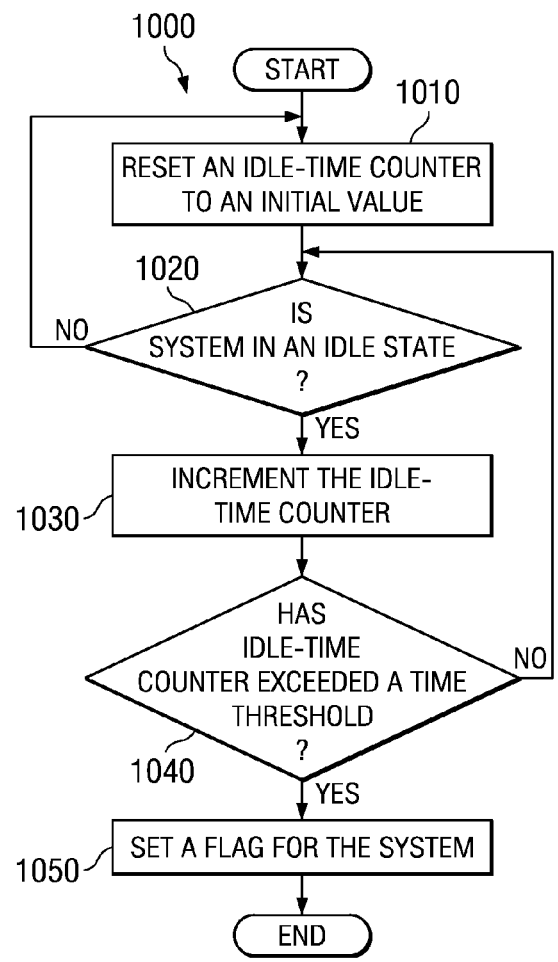
FIG. 10 is a block diagram for a system process for counting an idle time of the networked system.

Referring now to FIG. 10, a block diagram is shown for a system process for counting an idle time of the networked system in which illustrative embodiments may be implemented. Process 1000 is a software process such as idle-time counters 341A-341D of FIG. 3A-C. Process 1000 is implemented on a networked system, such as systems 320A-320D of FIG. 3A-C. Process 1000 counts a time duration during which the system remains idle and compares the counted time duration to a time threshold.

Responsive to the system being powered-on, process 1000 begins by resetting an idle-time counter to an initial value (step 1010). Process 1000 next identifies whether the system is in an idle state (step 1020). The system is in an idle state when the client is not accessing or utilizing resources, programs, or data on the selected system. If the system is not in an idle state ("no" at step 1020), process 1000 returns to step 1010, and the idle-time counter is reset to its initial value.

If the system is in an idle state ("yes" at step 1020), process 1000 increments the idle-time counter (step 1030). Process 1000 then identifies whether the idle-time counter has exceeded a time threshold (step 1040). If the idle-time counter has not exceeded the time threshold ("no" at step 1040), process 1000 returns to step 1020.

If the idle-time counter has exceeded the time threshold ("yes" at step 1040), process 1000 sets a flag for the system (step 1050). Process 1000 terminates thereafter.

A server process, such as system checkout process 314 of FIG. 3A-C, periodically polls networked systems. In response to determining that process 1000 has flagged the associated system, the server process executes a check-in process similar to that shown and described in FIG. 7.

Responsive to determining that process 1000 has flagged the associated system, the server process marks the checkout status in the database for the selected system as available. The server process then provides notification to image power process that the selected system has been flagged. The image power process then forwards a corresponding power-off routine to the selected system. In response to receiving the power-off routine, the selected system is powered off. The connection between the selected system and the client through the network is terminated, such that the client can no longer access the selected system and the resources, programs, and data thereon, without again going through the checkout process.

Figure 11:
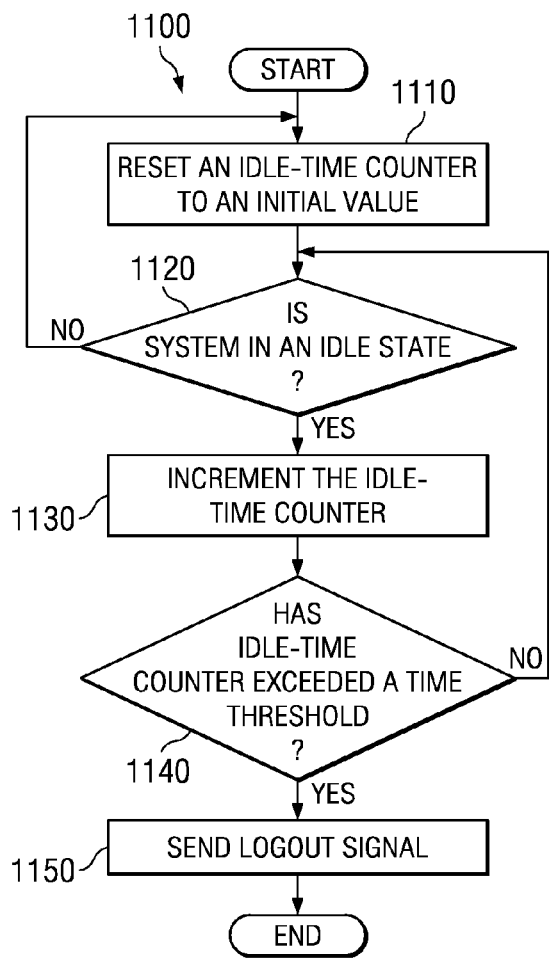
FIG. 11 is a block diagram for a system process for counting an idle time of the networked system in which illustrative embodiments may be implemented.

Referring now to FIG. 11, a flowchart for a system process for counting an idle time of the networked system in which illustrative embodiments may be implemented. Process 1100 is a process in a software component, such as idle-time counter 340A-340D of FIG. 3A-C. Process 1100 is implemented on a networked system, such as systems 320A-320D of FIG. 3A-C. Process 1100 counts a time duration during which the system remains idle and compares the counted time duration to a time threshold.

Responsive to the system being powered-on, process 1100 begins by resetting an idle-time counter to an initial value (step 1110). Process 1100 next identifies whether the system is in an idle state (step 1120). The system is in an idle state when the client is not accessing or utilizing resources, programs, or data on the selected system. If the system is not in an idle state ("no" at step 1120), process 1100 returns to step 1110, and the idle-time counter is reset to its initial value.

If the system is in an idle state ("yes" at step 1120), process 1100 increments the idle-time counter (step 1030). Process 1100 then identifies whether the idle-time counter has exceeded a time threshold (step 1140). If the idle-time counter has not exceeded the time threshold ("no" at step 1140), process 1100 returns to step 1120.

If the idle-time counter has exceeded the time threshold ("yes" at step 1140), process 1100 sends a check-in signal (step 1150) to a server process, such as system checkout process 314 of FIG. 3A-C. Process 1100 terminates thereafter. In response to receiving the check-in signal from process 1100, the server process executes a check-in process similar to that shown and described in FIG. 7.

Responsive to receiving a check-in signal from process 1100, the server process marks the checkout status in the database for the selected system as available. The server process then provides notification to the image power process that the selected system has been flagged. The image power process then forwards a corresponding power-off routine to the selected system. In response to receiving the power-off routine, the selected system is powered off. The connection between the selected system and the client through a network is terminated, such that the client can no longer access the selected system and the resources, programs, and data thereon, without again going through the checkout process.

Thus the present invention provides a data processing system, a computer implemented method, and a computer program product for effectively managing power to a number of systems in a network. A network system checkout system is accessed by another program that powers off unused systems. When a user checks out a system, it is powered on. The checkout system keeps track of the usage of various systems on a network so that only the systems that need to remain on for productivity will consume power, with idle systems being powered off. Records of system usage are stored in an associated database.

When a user checks out a system in the inventory, a message is sent to the power server, and a "power-on" command is issued, powering the system on. The "power-on" command can be a "wake on local area network" command for a physical system. For virtual systems, including logical partitions, the "power-on" command can be a transmission control protocol/internet protocol command issued from a hardware management console. The system is active as long as the user has the system checked out, and will remain powered on so long as the system remains unflagged as idle.

At predetermined time intervals, the database is checked by the inventory system for network systems that have "expired" and are no longer in use. The inventory system sends a list of systems that are not being used to the power image server. The power image server then powers the systems off through a program that resides on all systems that was imaged to the power image server. Networked systems are powered down and will be powered on when they are subsequently checked out.

The presently described embodiments therefore provide a user with a method to remotely access and reserve networked systems. By providing the checkout system with an expired or idle-state, an enterprise can monitor which of the networked systems are in use, and power-off those systems that are not currently in use.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing power in a network environment, the method comprising:
    responsive to identifying a selected system from a plurality of networked systems, powering-on, by an image power server, the selected system, wherein the step of powering-on the selected system is performed by a power-on routine sent from an image power server, wherein the power-on routine is selected from a plurality of power-on routines stored on the image power server, each of the plurality of power-on routines being unique to one of the plurality of networked systems;
    monitoring, by the image power server, the selected system while the selected system is powered-on;
    responsive to an identification that the selected system is in a check-in state, de-assigning, by the image power server, the selected system from a user; and
    responsive to an identification that the selected system is in the check-in state, powering-down, by the image power server, the selected system, wherein the step of powering-down the selected system is performed by a power-down routine sent from an image power server, wherein the power-down routine is selected from a plurality of power-down routines stored on the image power server, each of the plurality of power-down routines being unique to one of the plurality of networked systems.

2. The computer implemented method of claim 1 further comprising:
    receiving a request to reserve a system;
    responsive to receiving the request, identifying a set of systems from the plurality of networked systems as available systems;
    responsive to identifying the available systems, identifying the selected system from the available systems;
    responsive to identifying the selected system, assigning the selected system to the user; and
    responsive to identifying the selected system, powering-on the selected system.

3. The computer implemented method of claim 2, wherein the step of identifying the set of systems as the available systems comprises examining a database and identifying that the set of systems is marked as "available", and wherein the step of assigning the selected system to the user comprises changing the selected system from being marked as "available" to being marked as "busy" in the database.

4. The computer implemented method of claim 1, wherein the step of de-assigning the selected system from the user comprises further changing the selected system from being marked as "busy" to being marked as "available" in a database.

5. The computer implemented method of claim 1, wherein the identification that the selected system is in the check-in state comprises one of receiving a check-in signal from the client, and identifying whether the selected system has exceeded an idle-time threshold.

6. The computer implemented method of claim 5, wherein the step of identifying that the selected system has exceeded the idle-time threshold is identified by examining an idle-time counter and identifying that the idle-time counter has exceeded the idle-time threshold.

7. The computer implemented method of claim 6, wherein identifying that the idle-time counter has exceeded the idle-time threshold is further identified by flagging the selected system.

8. A computer storage hardware having a computer program product encoded thereon for managing power in a network environment, the computer program product comprising:
    computer usable program code, responsive to identifying a selected system from a plurality of networked systems, for powering-on the selected system, wherein the step of powering-on the selected system is performed by a power-on routine sent from an image power server, wherein the power-on routine is selected from a plurality of power-on routines stored on the image power server, each of the plurality of power-on routines being unique to one of the plurality of networked systems;
    computer usable program code for monitoring the selected system while the selected system is powered-on;
    computer usable program code, responsive to an identification that the selected system is in a check-in state, for de-assigning the selected system from the user, and
    computer usable program code, responsive to an identification that the selected system is in the check-in state, for powering-down the selected system, wherein the step of powering-down the selected system is performed by a power-down routine sent from an image power server, wherein the power-down routine is selected a plurality of power-down routines stored on the image power server, each of the plurality of power-down routines being unique to one of the plurality of networked systems.

9. The computer storage hardware of claim 8, further comprising:
    computer usable program code for receiving a request to reserve a system;
    computer usable program code, responsive to receiving the request, for identifying a set of systems from the plurality of networked systems as available systems;
    computer usable program code, responsive to identifying the available systems, for identifying the selected system from the available systems;
    computer usable program code, responsive to identifying the selected system, for assigning the selected system to the user; and
    computer usable program code, responsive to identifying the selected system, for powering-on the selected system.

10. The computer storage hardware of claim 9, wherein the computer usable program code for identifying the set of systems as the available systems comprises computer usable program code for examining a database and identifying that the set of systems is marked as "available", and wherein the fourth instructions comprise changing the selected system from being marked as "available" to being marked as "busy" in the database.

11. The computer storage hardware of claim 8, wherein the computer usable program code for de-assigning the selected system from the user comprises computer usable program code for changing the selected system from being marked as "busy" to being marked as "available" in a database.

12. The computer storage hardware of claim 8, wherein identification that the selected system is in the check-in state comprises one of identification that a check-in signal has been received from the client, and identification that an idle-time threshold has been exceeded.

13. The computer storage hardware of claim 12, wherein the computer usable program code for identifying that the selected system has exceeded an idle-time threshold further comprises computer usable program code for examining an idle-time counter and computer usable program code for identifying that the idle-time counter has exceeded the idle-time threshold, and wherein identifying that the idle-time counter has exceeded the idle-time threshold is identified by flagging the selected system.

14. A data processing system comprising:
a bus;
a communications unit connected to the bus;
a storage device connected to the bus, wherein the storage device includes computer usable program code; and
a processor unit connected to the bus, wherein the processor unit executes the computer usable program code: responsive to identifying a selected system from a plurality of networked systems, to power-on the selected system, wherein the step of powering-on the selected system is performed by a power-on routine sent from an image power server, wherein the power-on routine is selected from a plurality of power-on routines stored on the image power server, each of the plurality of power-on routines being unique to one of the plurality of networked systems; responsive to powering-on the selected system, to monitor the selected system to identify a check-in state; responsive to identifying the check-in state, to de-assign the selected system from the user; and responsive to identifying the check-in state, to power-down the selected system, wherein the step of powering-down the selected system is performed by a power-down routine sent from an image power server, wherein the power-down routine is selected from a plurality of power-down routines stored on the image power server, each of the plurality of power-down routines being unique to one of the plurality of networked systems.

15. The data processing system of claim 14, wherein the processor unit executes the computer usable program code: to receive a request to reserve a system; responsive to receiving the request, to identify a set of systems from the plurality of networked systems as available systems; responsive to identifying the available systems, to identify the selected system from the available systems; responsive to identifying the selected system, to assign the selected system to the user; and responsive to identifying the selected system, to power-on the selected system.

16. The data processing system of claim 14, wherein the processor unit executing the computer usable program code to identify the set of systems as the available systems further comprises the processor unit executes the computer usable program code to examine a database and to identify that the set of systems is marked as "available", and wherein the processor unit executing the computer usable program code to assign the selected system to the user further comprises the processor unit executing the computer usable program code to change the selected system from being marked as "available" to being marked as "busy" in the database.

17. The data processing system of claim 14, wherein the processor unit executing the computer usable program code to de-assign the selected system from the user further comprises the processor unit executing the computer usable program code to change the selected system from being marked as "busy" to being marked as "available" in a database.

18. The data processing system of claim 14, wherein the processor unit executing the computer usable program code to monitor the selected system to identify the check-in state comprises one of the processor unit executing the computer usable program code to receive a check-in signal from the client, and the processor unit executing the computer usable program code to identify whether the selected system has exceeded an idle-time threshold.

19. The data processing system of claim 18, wherein the processor unit executing the computer usable program code to identify that the selected system has exceeded an idle-time threshold further comprises the processor unit executing the computer usable program code to examine an idle-time counter and to identify that the idle-time counter has exceeded the idle-time threshold.

20. The data processing system of claim 19, the processor unit executing the computer usable program code to identify that the idle-time counter has exceeded the idle-time threshold further comprises the processor unit executing the computer usable program code to flag the selected system.

* * * * *